United States Patent [19]

Luhn et al.

[11] Patent Number: 4,533,863

[45] Date of Patent: Aug. 6, 1985

[54] VOLTAGE REGULATOR

[75] Inventors: Dennis A. Luhn, Richfield; Mark H. Schultz, Mounds View, both of Minn.

[73] Assignee: McGraw-Edison Company, Rolling Meadows, Ill.

[21] Appl. No.: 545,754

[22] Filed: Oct. 26, 1983

[51] Int. Cl.³ .............................................. H02P 9/30
[52] U.S. Cl. ...................................... 322/28; 322/32; 322/73
[58] Field of Search ..................... 322/28, 29, 32, 72, 322/73, 89, 31

[56] References Cited

U.S. PATENT DOCUMENTS

| | | |
|---|---|---|
| 3,170,110 | 2/1965 | Pratt . |
| 3,522,508 | 8/1970 | Gadd . |
| 3,858,108 | 12/1974 | Bray .......................................... 322/28 |
| 3,984,755 | 10/1976 | Lenhoff et al. ......................... 322/28 |
| 4,059,771 | 11/1977 | Jacobs et al. ...................... 320/64 X |
| 4,146,264 | 3/1979 | Korzeniewski .................... 322/31 X |
| 4,219,769 | 8/1980 | McFarlane et al. .................. 322/28 |
| 4,335,344 | 6/1982 | Gant .................................. 322/73 X |
| 4,359,679 | 11/1982 | Regan ................................. 323/272 |
| 4,360,772 | 11/1982 | Voss ....................................... 322/28 |
| 4,368,417 | 1/1983 | Matsuyama ........................... 322/29 |
| 4,384,245 | 5/1983 | Metter ................................... 322/28 |

Primary Examiner—R. J. Hickey
Attorney, Agent, or Firm—Jon C. Gealow; James A. Gabala; Hugh M. Gilroy

[57] ABSTRACT

A voltage regulator is described adapted for use controlling the output of an AC generator. A voltage control field-winding excitation control circuit supplies direct current to the generator field in response to a driver. The driver, in turn, is operated in response to a switching regulator. A frequency sensing means generates a voltage proportional to the frequency of the generator. This frequency sensitive voltage is combined with a reference voltage to drive an asynchronous switching regulator. The switching regulator produces a train of output voltage control signals to operate the driver. Preferably power MOSFETs are used to control the flow of current to the generator field. Loss of voltage and high current protection features are included.

28 Claims, 11 Drawing Figures

$$\frac{VO}{VIN} = \frac{(R9\ C6S+1)(R10\ R15)(C5S+1)}{R10\ C6S\ (R15\ C5S+1)}$$

FIG. 8

$$\frac{Vo(S)}{Vref(S)} = \frac{C(S) \, D(S)}{1 + C(S) \, D(S)}$$

FIG. 9

VOLTAGE REGULATOR

TECHNICAL FIELD

This invention relates to voltage regulators, in general, and to solid-state voltage regulators used to automatically control the output voltage of an AC generator.

BACKGROUND OF THE INVENTION

Controlling the field of a generator has always been somewhat of a problem when the operating efficiency of the system is of key importance. In such cases, a high-efficiency circuit is imperative. To maintain a relatively constant voltage, the circuit should have voltage feedback to increase the current delivered to the field under loaded conditions, while current feedback could be included to protect the system from over-current conditions. The circuit should also be designed so that the generator can be controlled from full stop to full speed. Frequency compensation is also necessary.

Since a high-efficiency solid-state amplifier is needed to control the generator field, a study of amplifier classes is in order. The most common types of amplifiers are classes A, B, AB, C, and D. In the basic class-A transistor amplifier, a specific quiescent current Ib is always present in the base of the transistor. This base current results in a collector current (Ic) of $Ib \times B$, where B is the current amplification factor of the device. With the amplifier not processing any signals, there will be some collector current flowing. However, this is wasted power since there is no demand for work to be done. Varying the base current varies the collector current, and causes the operating point to shift on the load line. As Ib decreases, the voltage across the device (Vce) increases.

According to Kirchhoff's Law, which states that the sum of the voltages around a loop must be zero, we can see that any voltage which is not dropped across the load controlled by the transistor must be dropped across the transistor. Therefore, not only is power being dissipated in the load, but power is also being dissipated as heat in the transistor. This mode of operation is very inefficient. In fact, the maximum operating efficiency for a class-A amplifier is 50%—this is unacceptable for generator field control. Examples of an elementary voltage regulators using transistors are U.S. Pat. No. 4,360,772 to Voss; and U.S. Pat. No. 3,076,922 to Seike.

The class-B amplifier, has a greater operating efficiency than a class A. In this case, the two transistors are biased at cutoff, eliminating the inefficiency of quiescent current. One half of an input signal causes one transistor to conduct and the other to be reverse-biased. The other half of the input signal causes the opposite to happen. Unfortunately, any voltage still not dropped across the load is dropped across the device. As in class-A operation, any power not dissipated in the load is wasted as heat. The maximum efficiency of this amplifier is 78.5% which is better but still an unacceptable design. U.S. Pat. No. 3,170,110 is an example.

From the brief review of class-A and B amplifiers, we can see that in any amplifier configuration, inefficiency is present when the difference in power supply voltage and load voltage is dropped across the device (assuming some current flow). Any amplifier configuration in which the device is operated in the linear region cannot be used since maximum efficiency is a mandatory requirement. Since classes AB and C also operate in this manner, they can be eliminated as possibilities for this design. Therefore, exit classes A, B, AB, C and enter class D—the switching amplifier.

The active device in a class-D amplifier is never operated in the linear region as it is either in cutoff or saturation. If the device is in saturation, the voltage across it is theoretically zero (maximum current) and no power is dissipated. When the device is reverse biased, there is maximum voltage but no current (theoretically) and no power is dissipated. Thus, the class-D configuration can be looked at as a simple on/off switch. By this simple representation we can see that all the power will be dissipated in the load, and we have achieved a maximum theoretical efficiency of 100%. The actual efficiency is less, of course, due to certain characteristics of the semiconductor switching device. We expect the voltage across a closed switch to be zero. In actuality there is some small voltage across the device in the saturated state (Vsat), just as there is some leakage current through the device in the cutoff state. Although this type of amplifier is far better than the others, another major problem remains—the selection of the solid-state device that will accomplish the actual power switching. What is needed is a solid-state device having low "on" resistance, resulting in low Vsat, and low leakage current. These two factors reduce the power dissipated in the solid-state device during the "on" and "off" cycles. Heretofore, bipolar switching devices have been used. Examples are presented in U.S. Pat. No. 3,984,755 to Lenhoff (SCR's); and U.S. Pat. No. 4,219,769 to Mac Farlane (TRIAC's). The main disadvantages of bipolars are their inherent "current hogging" characteristics. The current in a bipolar generates heat. The buildup of heat results in a lowering of internal resistance, which leads to an increase in current flow. This phenomenon, known as "thermal runaway," is characteristic of bipolars in general.

Since it may be necessary to parallel the solid-state switching devices to obtain the required constant-current carrying capability, another important factor in selecting the switching device is the ease with which paralleling can be accomplished. Consider a simplified circuit formed from three transistors Qa, Qb, and Qc in parallel. Assume all three transistors are operating, and sharing current, I. Now assume that Qa heats up and passes more current than Qb or Qc. With more curent, it heats more, and will soon "run away" and self-destruct. If Qa destructs in the shorted sate, the load circuit will likely be damaged. If Qa fails in the open state, then Qb and Qc will be forced to handle the current originally meant for all three. This is what is meant by "current hogging." Soon Qb or Qc will also run away, causing another device failure. This process will continue until all the devices have self-destructed or the circuit fails.

Another circuit could be added to prevent this; but the addition of such circuitry would require extra power, thus reducing the efficiency of the system. Also, bipolars are current-operated devices requiring current-drive circuitry. A good engineering rule states that the less the component count in the design, the more reliable and efficient the system. Thus, bipolar devices used to switch current to the field of an AC generator are not only inherently inefficient but also unduly complicate the design of the overall circuit. What is needed is a highly efficient, simple, and reliable voltage regulator which overcomes these shortcomings. Heretofore, this long felt need has not been satisfied by voltage regulators incorporating bipolar power switching devices.

SUMMARY OF THE INVENTION

In accordance with the present invention a voltage regulator is provided to control the output voltage of an alternating current generator. In one embodiment, the voltage regulator comprises: a voltage controlled field-winding excitation control circuit which is connected across the output of the generator to supply direct current to the generator field-winding; means for driving the voltage controlled field-winding excitation control circuit; field sensing means for generating a voltage proportional to frequency of the output of the generator; and an asynchronous switching means, operating in response to the frequency sensing means and the voltage output of the generator, for producing a train of output voltage control signals which are adapted to operate the drive means. In the preferred embodiment the voltage controlled field-winding excitation control means is formed from one or more power MOSFETs conntected in series with the field-winding of the generator and a load sensing resistor. A rectifier connected across the output of the generator provides direct current to the series combination of the MOSFETs, the field-winding, and the load sensing resistor. In that case, the asynchronous switching means includes current limiting means, disposed across the current sensing resistor, for shutting off the train of output voltage control signals in the event that a pre-selected current flow is exceeded. Perferably, the frequency sensing means generates a voltage proporational to the frequency of the generator when the frequency is below a pre-selected break-point frequency and a constant voltage when the frequency is above the break-point frequency. This feature prevents the generator output voltage from going "high" if the prime mover driving the generator over-speeds. It also keeps the voltage out of the generator constant over engine speed changes that can occur under varying load conditions.

In one embodiment the asynchronous switching means includes a pulse width modulator driven by a free-running oscillator. Since a MOSFET, unlike a SCR, can be turned "off" at any time, it is not necessary to synchronize the pulse train to the alternating current flowing out of the generator. Thus, the current limiting means can shut "off" the MOSFETs as soon as an overcurrent condition is sensed.

Another unique aspect of the invention is the manner in which the MOSFETs are turned "on" during generator startup. In the embodiment illustrated, the gates of the MOSFETs are controlled by a common emmiter transistor switch. A zener diode circuit, connected to the base of the transistor, holds the transistor shut-off until the voltage out of the generator exceeds a preselected value sufficient to operate the asynchronous switching means. A voltage doubler is then used to supply the gates of the MOSFETs. In this manner the MOSFETs are kept "on" during generator start-up. Finally, to limit the magnitude and the rate of rise of voltage that occurs upon commutation of the field-winding, a voltage snubbing means is provided. Waveform notching is limited by a filtering means disposed across the output of the rectifier supplying direct current to the field-windings.

Other advantages and features of the present invention will become readily apparent from the following detailed description of the invention and the embodiments illustrated in the drawings, and from the claims wherein the unique combination of elements forming the invention will be found to result in a highly beneficial and substantial improvement in the art of voltage regulators.

TECHNICAL DESCRIPTION

While this invention is succeptable of embodiment in many different forms, there is shown in the drawings and will herein be described in detail one specificate embodiment with the understanding that the present disclosure is to be considered an exemplification of the principles of the invention and is not intended to limit the invention to the specific embodiments illustrated.

Figure 1A:
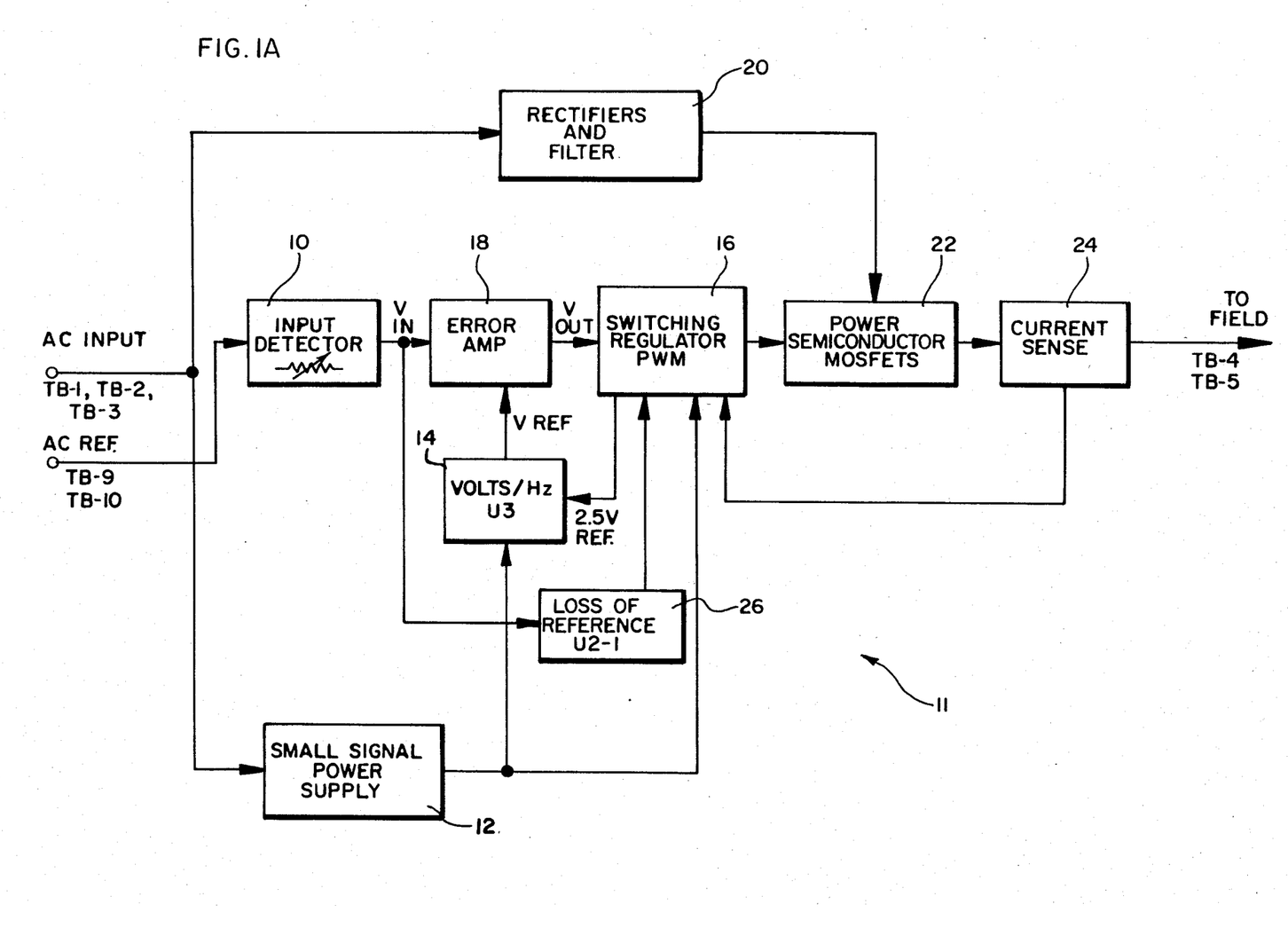
FIG. 1A is a functional block diagram of the voltage regulator that is the subject of the present invention.

Before describing the details of the invention, a functional description of the preferred embodiment will be given so that the unique manner in which the invention operates will be better appreciated. Turning to FIG. 1A, a block diagram is presented of the Voltage Regulator 11 that is the subject of the present invention. An AC reference voltage, derived from the output of the generator to which the regulator is attached, is used to drive an Input Detector 10. The Input Detector rectifies and filters the AC signal to produce a control signal Vin. The Input Detector as such sets the voltage that the generator will maintain. The AC output of the generator also is supplied to a Small Signal Power Supply 12 which supplies power to a Voltage to Frequency Converter 14 and a Switching Regulator 16.

The Voltage to Frequency Converter 14 receives a reference voltage from the switching regulator 16. An Error Amplifier 18 combines the output of the Input Detector 10 and the Voltage Frequency Converter 14 to produce an output voltage signal Vout. The output of the Error Amplifier is effectively a frequency compensated voltage signal that is a measure of the difference between the actual output voltage of the generator and the desired output voltage. This voltage signal is then sent to the Switching Regulator 16 where it is pulse width modulated into a train of output voltage control signals.

The output of the generator also supplies a Rectifier and Filter Network 20. The output of the Rectifier and Filter Network 20 is switched to the field-winding of the generator through a set of power MOSFETs 22. The gates of the MOSFETs are operated in response to the pulse train from the Switching Regulator 16. A Current Sensing Network 24 measures the current flowing to the field of the generator and, if a pre-selected level is exceeded, shuts down the Switching Regulator. The Switching Regulator 16 is also shut down by Loss of Reference Network 26. This would occur in the event that the voltage at the output of the generator drops below a pre-selected level. Thus, the flow of current to the field of the generator is operated in response to the switching action of the power MOSFETs.

Figure 1B:
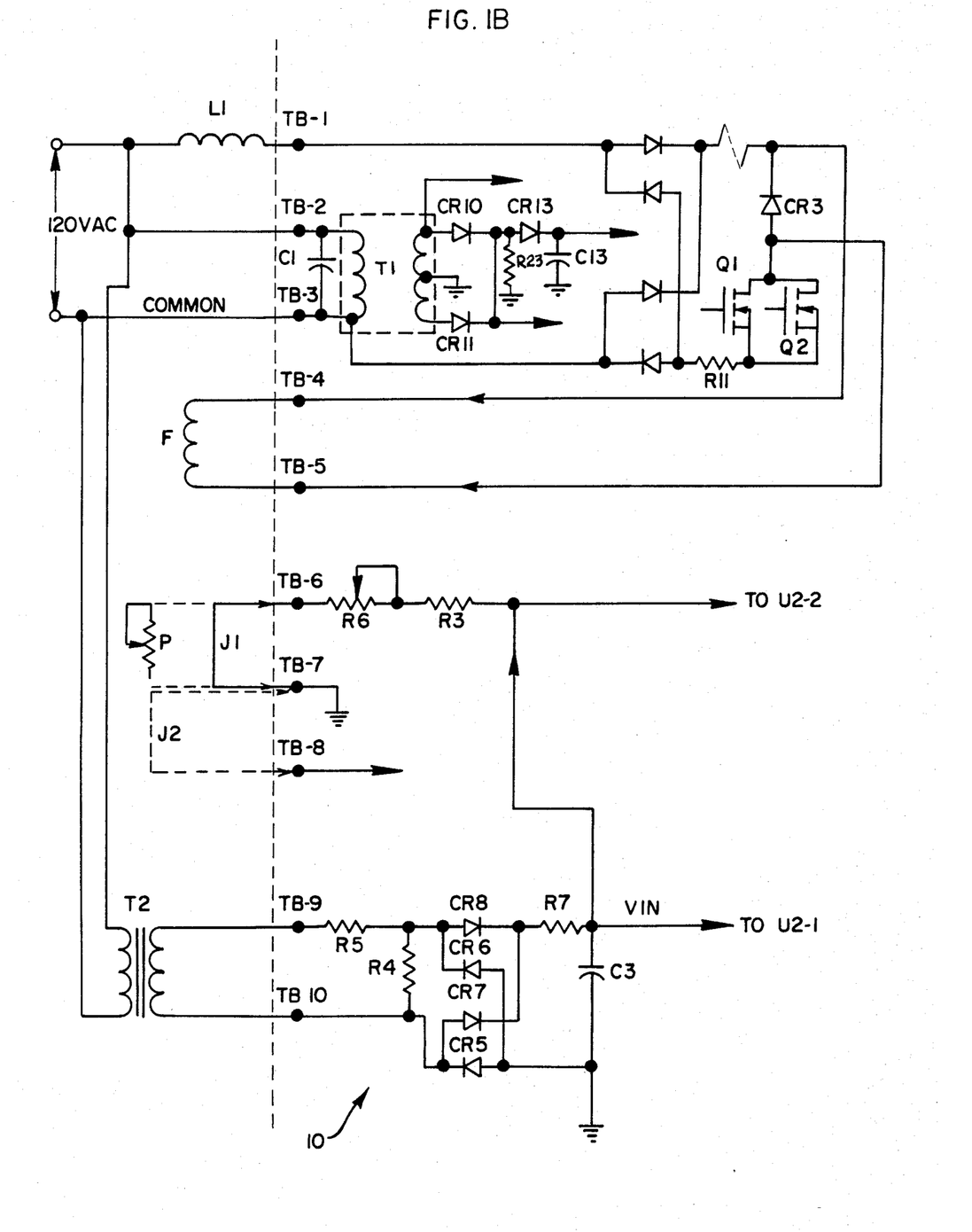
FIG. 1B is a schematic diagram of the interface between the voltage regulator and the associated generator.

Now that the principle elements of the invention have been described, the details of the invention will be explained. First, however, reference should be made to FIG. 1B. FIG. 1B shows the manner in which the voltage regulator interfaces with the output terminals of the generator. Components of the voltage regulator are shown to the right of the vertical broken line passing down the center of the page. Terminal TB-1 is used to connect the generator output to the power stage via an inductor coil L1. Terminal TB-2 is a generator input to a Small Signal Power Supply Transformer T1. Terminal TB-3 is a common terminal for terminals TB-1 and TB-2. The generator field-winding F is connected to the voltage regulator via terminals TB-4 and TB-5. For operator convenience, an external voltage adjusting potentiometer P may be used between terminals TB-6 and terminals TB-7. Terminal TB-7 is a ground connection. If the external potentiometer P is not used, a jumper J1 is used to connect terminals TB-6 and TB-7 together. As will be explained in short order, the voltage regulator incorporates a feature to allow for use for either 50 HZ or 60 HZ operation. In the event that 50 HZ operation is desired, terminals TB-7 and TB-8 are connected together with another jumper J2. A generator input reference signal is provided by an isolation transformer T2 connected across the output of the generator. The output of the isolation transformer T2 is fed to terminals TB-9 and TB-10. The relationship of these various terminals and their associated components will becomeclear from the following discussion.

POWER STAGE

The Power Stage (see FIG. 3) consists of: a Full Wave Bridge Rectifier made of two half bridges CR1 and CR2 in two T0-3 packages; a Voltage Snubber consisting of a resistor R1, diode CR4 and two capacitors C17 and C18; a free-wheeling diode CR3 for the generator field; a transient suppressor zener diode VR1; and two power MOSFET's Q1 and Q2 in parallel. The power stage is connected externally to the 120 VAC (nominal) generator output through an inductor L1 and to the exciter field winding (See FIG. 1B).

Figure 3:
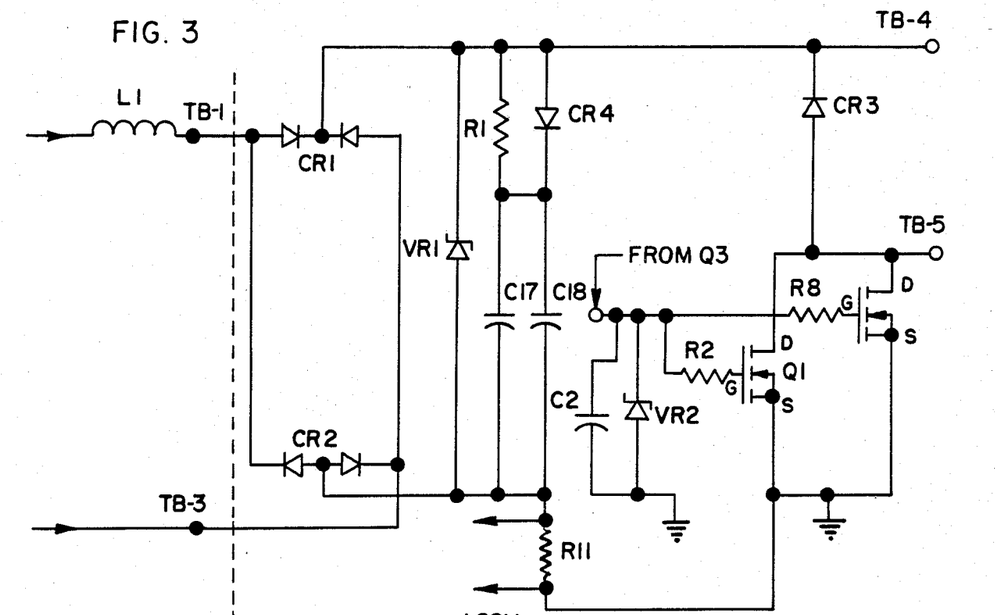
FIG. 3 is a partial-schematic diagram of the power stage of the voltage regulator.

The Power Stage uses two power MOSFET transistors Q1 and Q2 in parallel as the means of turning the field current "on" and "off". MOSFETs are particularly suited for this design, especially those known as VFETs and HEXFETs. The main advantage of using these FETs is their high-impedance, voltage-operated gate, low "on" resistance, low leakage current, and negative temperature coefficient. An amplifier employing power MOSFETs can be driven directly from the output of a PWM circuit (comparator voltage output) since the high input impedance (100 kilohms) of these devices eliminates preamplifier loading problems, the low "on" resistance (typically less than 1 ohm) and low leakage current assure a minimum power dissipation in the device during "on" and "off" times.

Of equal importance is a MOSFET's negative temperature coefficient, allowing ease of paralleling. As it heats up, it draws less current, forcing other devices to share the current until the first cools. Thus, paralleled FETs are self-stabilizing due to this characteristic. To insure heat dissipation, both MOSFET's are preferably mounted on aluminum heat sinks. The sources are grounded and the drains tied together and connected to one side of the field winding. Wire of sufficient gauge should be used to permit heavy current drain. To help eliminate the problem of inductive voltage spikes, a free-wheeling diode CR3 is used across the field. Higher current capability can be obtained, of course, by paralleling more FETs.

It is important to also understand that FET's, although similar bipolar devices, are voltage controlled devices instead of current controlled. When a voltage is applied to the "gate" of a FET, the "drain to source" resistance changes from a very large value to approximately 1 ohm per device (0.5 ohm total in the embodiment shown in the drawings). The speed at which the change takes place depends on how quickly the gate to source voltage rises. The gate of the MOSFET can be modeled as a capacitor. Thus, the switching time depends on how fast you can charge and discharge the gate to source capacitance.

In the embodiment shown in the drawings the MOSFETs are two model IRF 330 manufactured by International Rectifier. Each has a continuous current rating of 4 amperes. If the load requires more or less current, the number of FETs can be increased or decreased accordingly. Other manufacturers are Motorola and Siliconix. Since power MOSFETs are not inexpensive, it is recommended that a comparison be made of data sheets concerning limits of power FETs be made if another MOSFET model is used.

Each MOSFET is driven by a transistor Q3 (See FIG. 5) whose collector is tied to supply through a resistor R25. There is also a capacitor C2 effectively in parallel with the gate to source capacitance. The MOSFET turn-on time is then the time it takes the capacitance to charge up to the MOSFET threshold voltage. The input capacitance to power MOSFETs is relatively high due to the insulated gate and large chip topography. The threshold voltage is the voltage at which the FET begins to change state (i.e., 1 to 4.5 V). The turn on time is approximately 1.5 microseconds.

Figure 5:
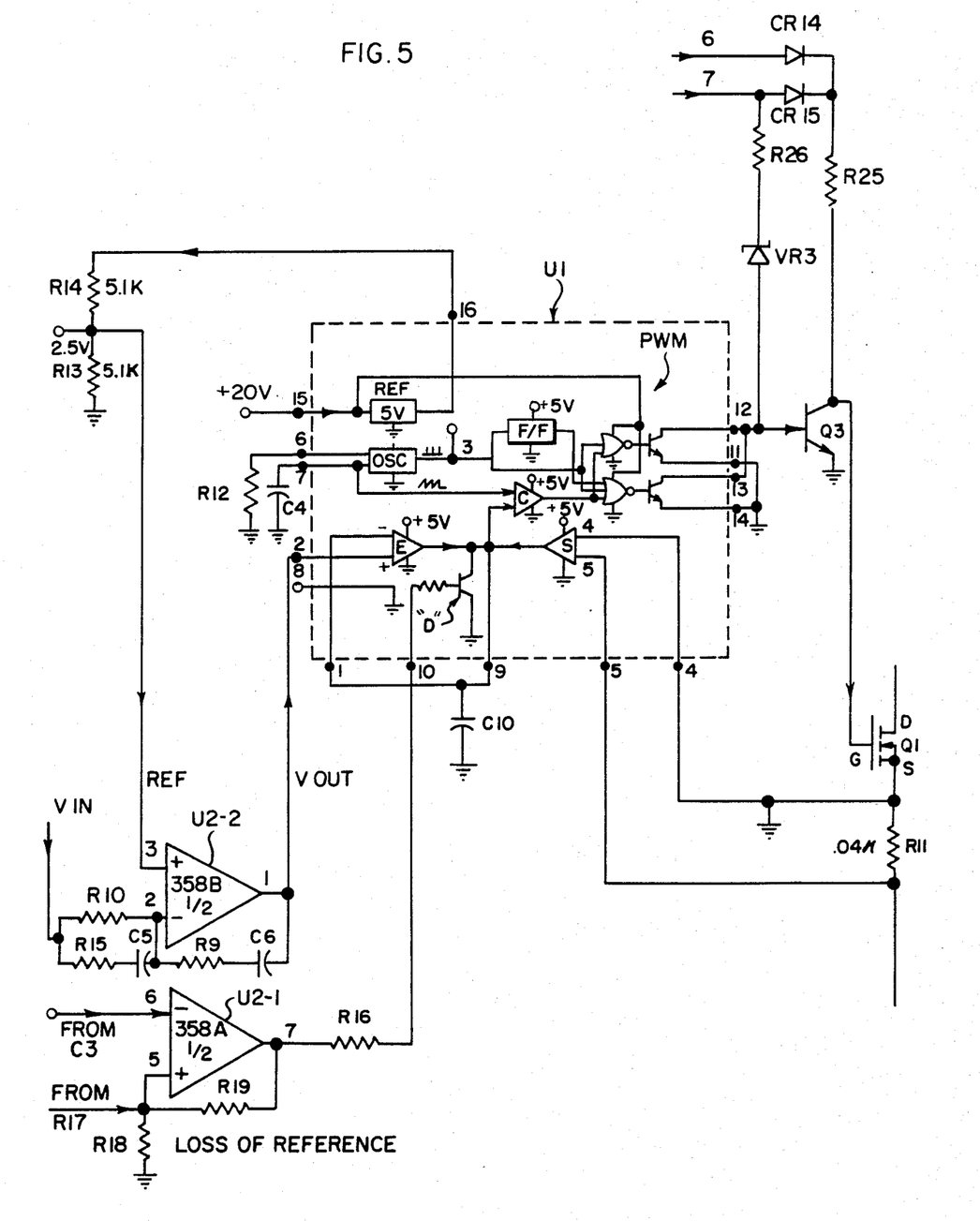
FIG. 5 is a partial-schematic diagram of the asynchronous switching regulator portion of the invention.

It is necessary to slow the "turn-on" time of the FETs to reduce the stress on the free-wheeling diode CR3. The free-wheeler's reverse recovery time is 200 ns. A good "Rule of Thumb" is that the transistor should switch at least three times slower than the diode. The "turn-off" time is determined by the discharge of the gate to source capacitance through the two 100 ohm resistors R2 and R8. It is made fast to reduce the transistor switching losses. The 100 ohm resistors R2 and R8, in series with the gates of the MOSFET's, are necessary to isolate the gates to prevent oscillation between the two devices. The 18 V zener diode VR2 is used to clamp the voltage below the 20 V rating of the devices.

The Voltage Snubber consists of a resistor R1, a diode CR4 and two capacitors C17 and C18. It is used to limit the rate of rise of voltage that occurs upon commutation of the external inductor L1 current. When the MOSFET's turn "on", the current flows through L1 and out of the capacitors C17 and C18 (limited by R1) providing a filtering action to limit waveform notching. When the MOSFET's turn "off", the field current free-wheels (through CR3) and the inductor L1 current flows in C17 and C18 through diode CR4.

The worst case voltage stress will occur when the generator is loaded heavy enough to put the regulator in the current limit *and* and the load is removed. The generator voltage will rise briefly, to a full field condition. The capacitor voltage will rise to approximately 350 V maximum. Any excursions higher than 350 V will be clipped by a 350 V zener type transient suppressor VR1.

INPUT DETECTOR

The Input Detector 10 (see FIG'S. 1A and 1B) gets 120 VAC from an external 1:1 reference transformer T2. This voltage is divided down (R4 and R5), full-wave rectified (CR5, CR6, CR7, and CR8), filtered (R7, CR3, etc), and combined with a 2.5 V reference voltage (through R13 and R14) to drive the Error Amplifier 18.

The Input Detector 10 includes the voltage adjust pot R6, which is used when input terminals TB-6 and TB-7 are jumpered together J1. If an external adjustment is required, TB-6 and TB-7 are connected to an external pot P. The input detector effectively produces an "average value" of the input so the regulator will try to maintain the average voltage out of the generator constant.

SMALL SIGNAL POWER SUPPLY

Figure 2A:
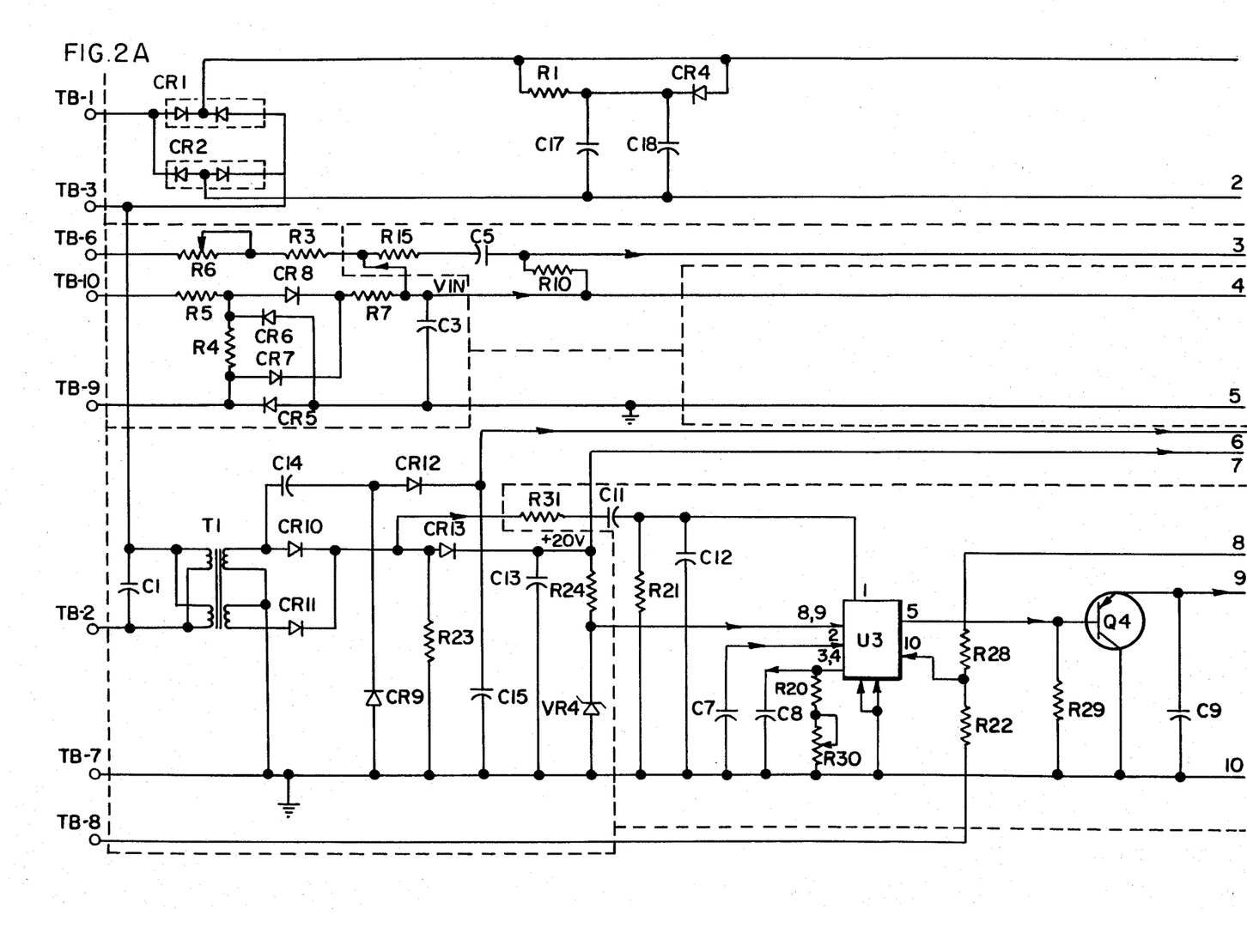
FIGS. 2A and 2B are the left and right-hand halves of a schmatic diagram of voltage regulator that is the subject of the present invention.
Figure 2B:
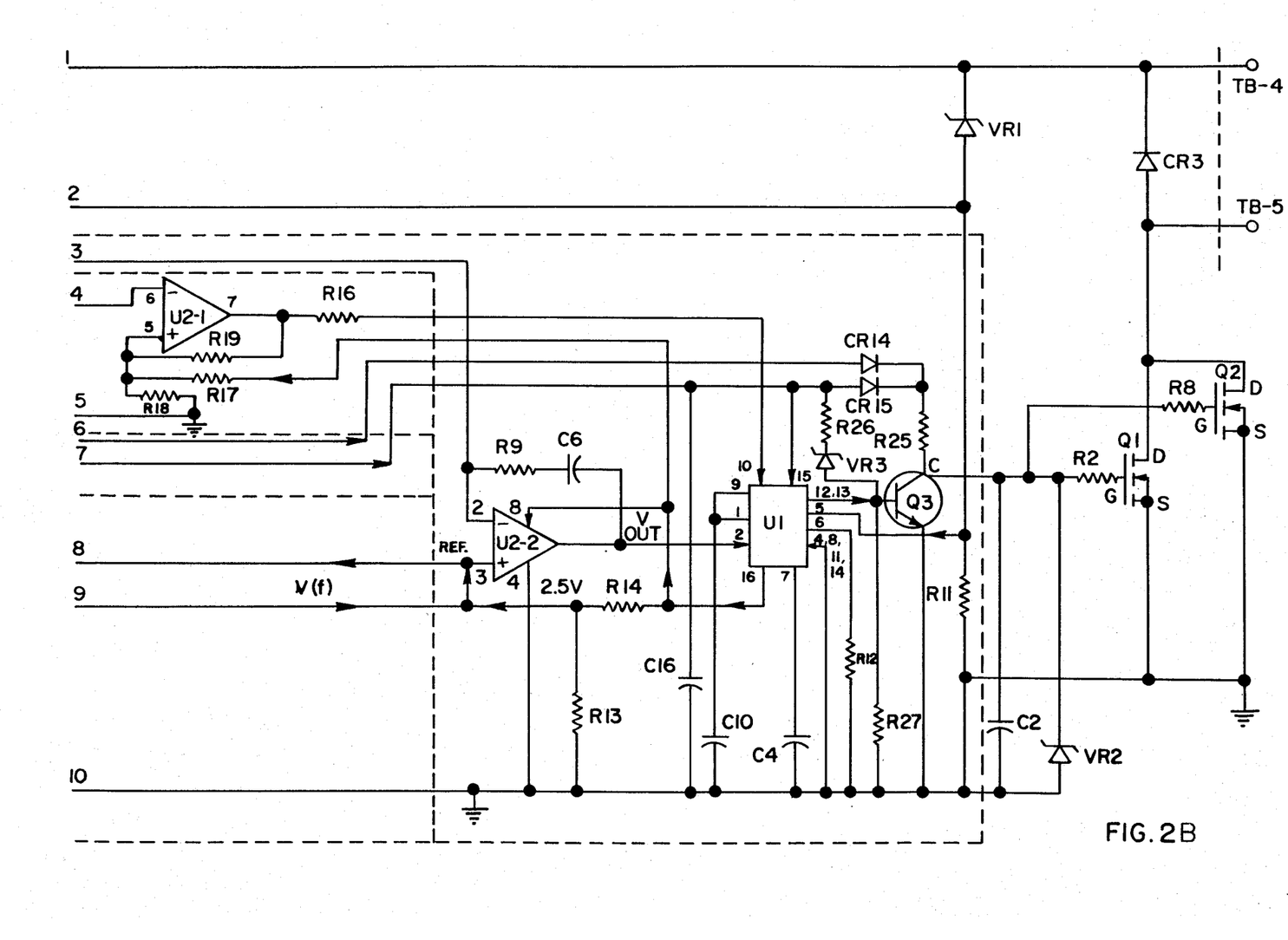

The Small Signal Power Supply 12 (See FIG. 2B) consists of 120 V (in) to 14 V (out) center tapped transformer T1. The output of this transformer is full wave rectified (CR10 and CR11, etc.) and filtered (R23, C13, etc.) to give approximately 20 VDC (out) with 120 V (in). This voltage (See FIG. 4) is supplied to a 750 ohm resistor R24 and 6.8 V zener diode VR4 for a power supply to the Frequency to Voltage Converter U3. The transformer T1 output is also connected as a Voltage Doubler (C14, CR9, CR12, C15 etc.) which is used as a power supply for the gates of the two MOSFET's.

Initially, the output voltage of the generator is very low since the voltage is essentially provided by the residual magnetism in the alternator laminations. Therefore, to insure buildup, a zener diode VR3 is used to keep transistor Q3 "off" and a Voltage Doubler is used to provide enough voltage to the gates of the power MOSFETs Q1 and Q2 to turn them "on" until the generator voltage is high enough for the Switching Regulator U1 to operate (See FIG. 2B).

FREQUENCY CONTROL

Figure 6:
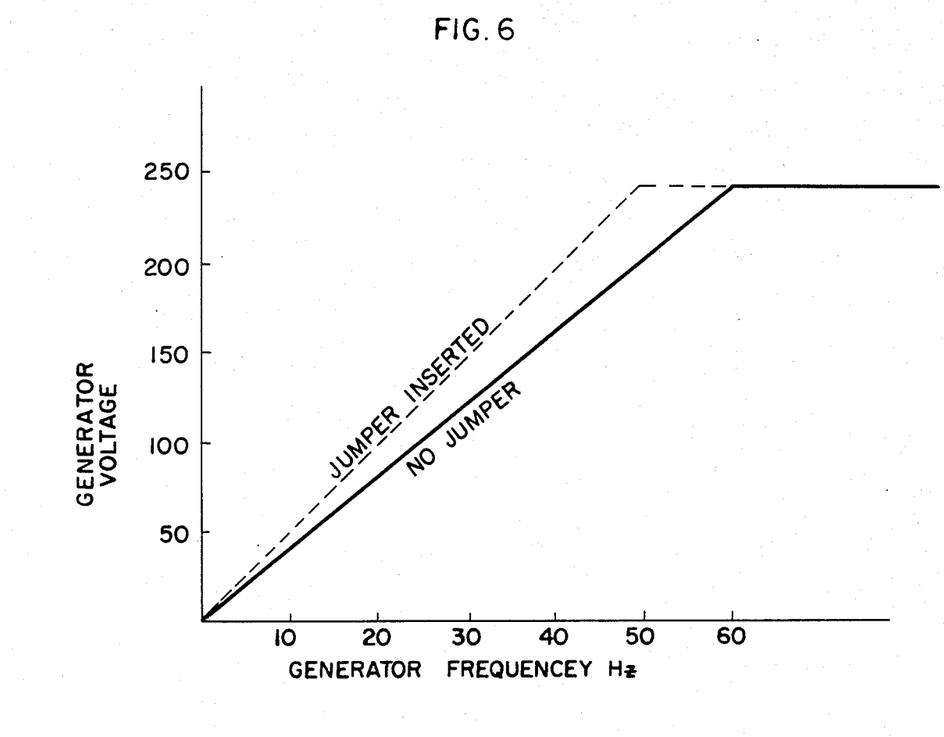
FIG. 6 is a graph of the voltage and frequency characteristic of the voltage regulator.

The Frequency Control Circuit senses generator frequency and adjusts a 2.5 volt reference (See FIG. 4) to produce a voltage signal characteristic the desired generator output voltage. The source of the 2.5 volt reference will be explained later. This circuit produces an output voltage independent of frequency after a preset frequency and provides a linear slope of 4 volts/Hz below that frequency (see FIG. 6). The break-point is adjustable by a pot R30. A jumper J2 (across input terminals TB-7 and TB-8) is also provided to shift the break-point from its setting for 60 Hz units to 50 Hz units (i.e., European usage).

Figure 4:
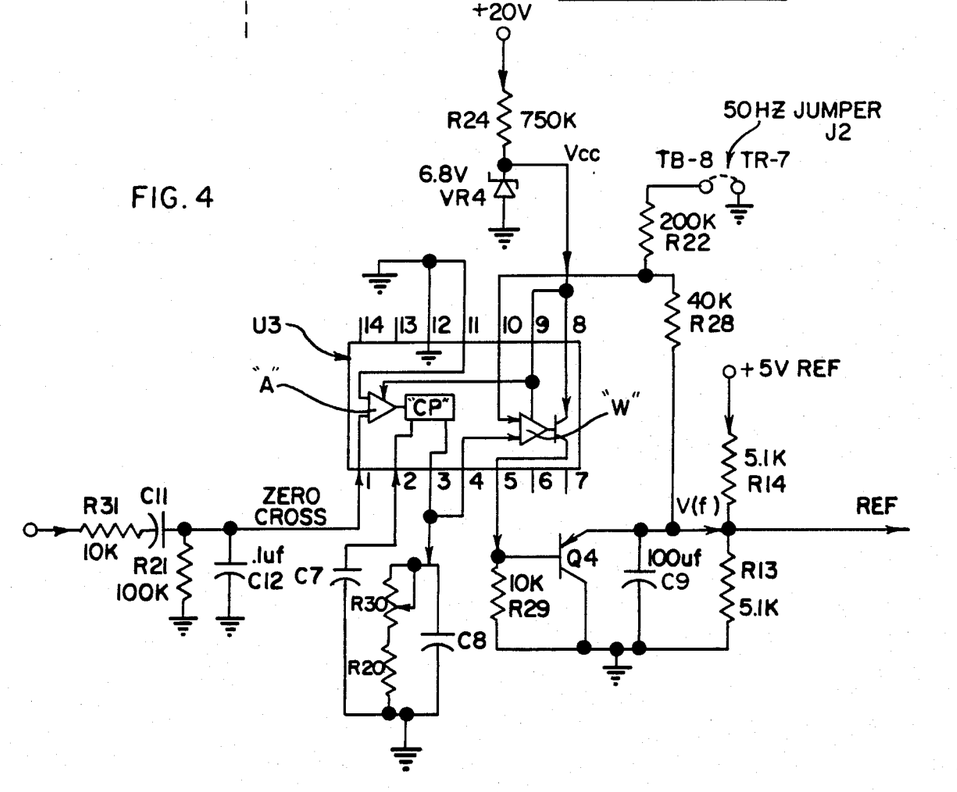
FIG. 4 is a partial schematic diagram of the frequency sensing stage of the voltage regulator.

Frequency sensing and adjustment is done by a frequency-to-voltage converter IC (Integrated Circuit) U3 (see FIG. 4). In the embodiment illustrated, the IC is a National Semiconductor LM 2907. The IC senses zero crossings and generates a voltage proportional to frequency. This voltage is used to adjust the 2.5 V reference voltage (See FIG. 5). The zero crossing sensing is done through pin 1 of the U3 which is one input to an internal comparator "A". In order to get zero crossing, the input is capacitively coupled from the rectified output of the small signal power supply transformer T1. The 10K resistor R31 and 0.1 uf capacitor C12 to ground form a noise filter. The 100K resistor R21 to ground is used to bias the comparator "A".

The zero-crossing comparator "A" triggers a charge pump "CP" which charges or discharges an external capacitor C7 linearly. An identical charge and discharge current is fed into a resistor R20, a pot R30, and a capacitor C8 which *integrates* the charging current. The output voltage (across C8) then is:

$$Vf = Vcc \times fin \times C7 \times (R20 + R30).$$

The voltage across this capacitor C8 is then the voltage that will appear at the voltage reference (with TB-7 and TB-8 not connected) of the regulator. At frequencies below the break-point frequency, the reference voltage will be proportional to the generator frequency. Connecting Q4 in the feedback loop produces a very sharp break-point since the output OP-amp "W" will compensate for the non-linearities in the junction of Q4. The reference voltage will be less than 2.5 V at frequencies less than the break-point and the voltage will rise as the frequencies increases until the Q4 junction becomes back biased. At this point the reference will be determined only by the voltage divider formed by the two 5.1K resistors R13 and R14.

With terminals TB-7 and TB-8 *not* jumpered the OP-amp "W" gain is unity and the regulator is adjusted for 60 Hz operation. The referenced voltage can be read at TB-8 with a high impedance voltmeter and a 0.1 uf capacitor from terminals TB-8 to TB-7.

With terminals TB-7 and TB-8 jumpered together the OP-amp gain is changed:

$$\text{gain} = \frac{R22 + R28}{R22} = \frac{200 + 40}{200} = \frac{240}{200} = \frac{6}{5} = 1.2$$

This is the slope that is required for 50 Hz operation:

$$\text{Slope} = \frac{60 \text{ Hz}}{50 \text{ Hz}} = 1.2$$

This allows one to change from 60 Hz operation to 50 Hz (See FIG. 6) without adjusting the break-point (i.e., if the 60 Hz break-point is set to 59 Hz with the jumper J2 inserted the breakpoint it will shift to 49 Hz.)

SWITCHING REGULATOR

The Switching Regulator U1 basically takes an input voltage and converts it to a pulse width modulated output. The Switching Regulator U1 (See FIG. 5) is an integrated circuit which contains: a Pulse Width Modulator "PWM", a Voltage Reference "V-REF"; a Current Limiter "S"; an Error Amplifier "E"; and Shut-down Control "D". In the embodiment illustrated, a Texas Instruments SG 1524 IC is used.

The Voltage Reference is an essentially constant regulated 5 V supply. Its input is 8 to 40 V into pin 15. The output is 5 V at 40 MA at pin 16. The reference is specified for a 1 percent voltage change from −55° to 125° C. The 5 V reference supplies power to the LM 358 Op-amp U2-2. It is divided in half by two 5.1 K-ohm resistors R13 and R14 and used as a 2.5 volt reference for the two operational amplifiers U2-1 and U2-2.

An oscillator "OSC", whose frequency is determined by R12 and C4, produces a linear ramp which is an in-put to the internal comparator "C". The other comparator input is (with some exceptions to be explained later) the voltage out of the error amplifier "E". The output of the comparator "C" is then pulse width modulated at the oscillator frequency. The comparator output is then steered by a flip-flop "F/F" to two output transistors, each of which will give 0-45% duty cycle. In this application, the output transistors are connected in parallel to give 0-100% duty cycle. A one to three volt input to the comparator will produce 0-100% duty cycle output.

The Error Amplifier "E" is an Op-amp which, in this application, is used as a unity gain amplifier by connecting pin 1 to pin 9. This amplifier "E" is a transconductance type which means the output is a current source instead of a voltage source. This also means the output of the amplifier can be shorted without damaging it. A fixed voltage (0 to 5 V) can be applied at this point (pin 9) and the Switching Regulator U1 will put out a fixed pulse width.

A current limiting function is included in the Switching Regulator U1 at pins 4 and 5. If a 200 mv signal is applied to these pins, the current limit comparator or Current Limiter "S" turns "on" and pulls pin 9 to ground shutting off the regulator. A 0.04 ohm resistor R11 (See FIG. 3), in series with the power MOSFET's, is used to sense current. With this value of resistance, 5A will shut the regulator down (i.e., 5 amp×0.04 ohm=200 mv). Since current sensing is done in the MOSFET lead, the circuit will oscillate if the voltage at pin 9 rises faster than the oscillator ramp; the oscillator frequency and the capacitor C10 from pin 9 to ground are sized to prevent this. Those skilled in the art will appreciate the fact that if an SCR power switchihg device were to be used, one would have to synchronize to the line since a bipolar device such as an SCR cannot be turned "off" except by a "zero-crossing" of the generator wave-form. Here current limiting can be performed as soon as an overcurrent condition is sensed by the current limitor "S". Those skilled in the art will also realize that this is another advantage of using MOSFETs. The ability to operate them asynchronously also makes the MOSFETs somewhat more immune to disruption from noise on the line.

Shutdown control in the Switching Regulator U1 is achieved by inserting a 5 V level at pin 10. This is used for a loss of reference shutdown.

LOSS OF REFERENCE PROTECTION

The Loss of Reference Protection Circuit 26 (See FIG. 1A) senses when the reference falls to near zero and shuts off the regulator. The circuit is essentially an OP-amp U2-1 used as a comparator. When the voltage across capacitor C3 is less than 0.4 V, the comparator puts 5 V to the shutdown input 10 of the pulse width modulator IC. This causes the generator voltage to decrease approximately 55 V. If the reference is restored while the set is running, the regulator will briefly go full field until the regulator recovers to normal operation.

COMPENSATION NETWORK

Figure 7:
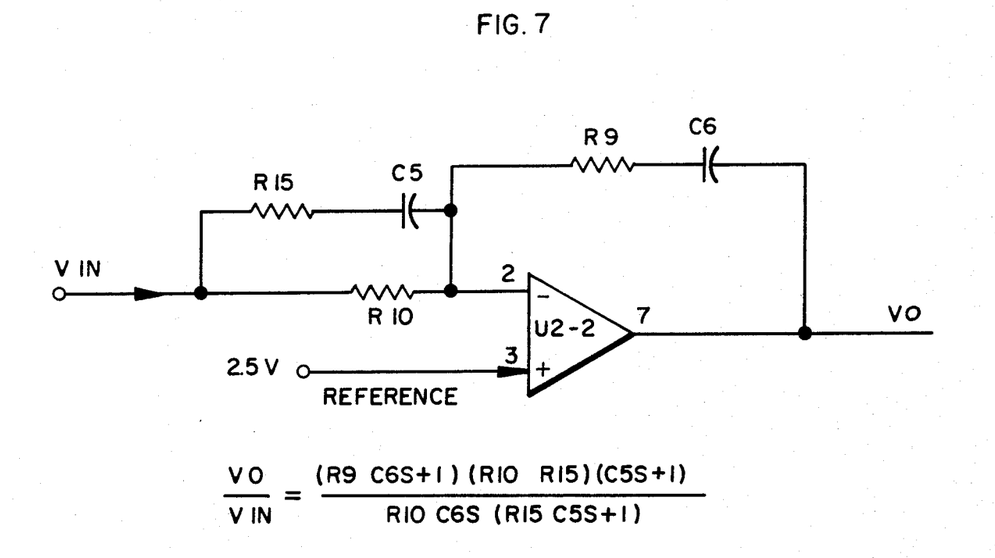
FIG. 7 is a simplified schematic diagram of the frequency compensation network.
Figure 8:
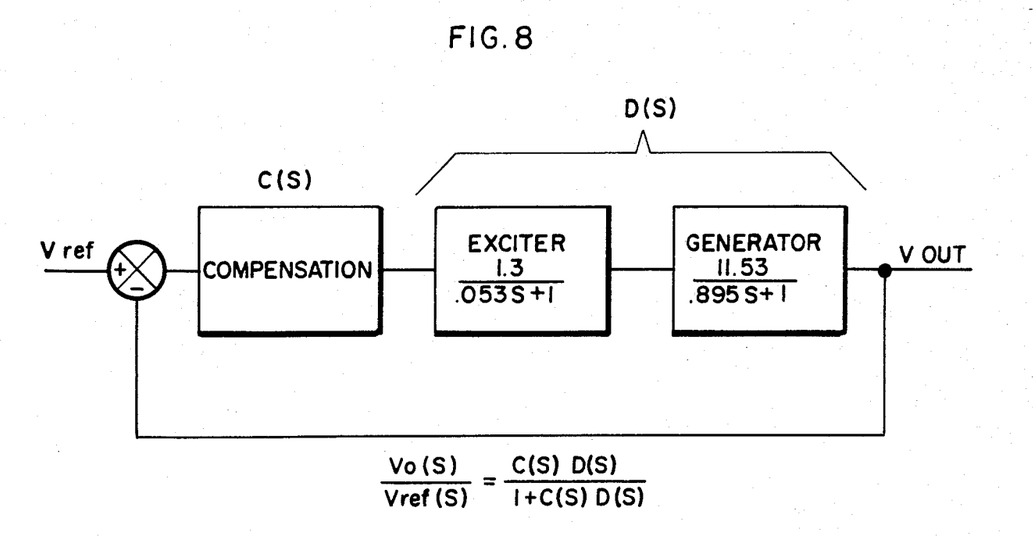
FIG. 8 is a block diagram of the relationship between the output voltage and the reference voltage.

The key to having a stable voltage regulator is the Compensation Network, shown in FIG. 7. The function of the Compensation Network can best be shown with the aid of Bode Plots and block diagrams. The simplified system block diagram is shown in FIG. 8. The block diagram shows that difference between the output voltage and the reference is applied to the compensation network, where it is modified and applied the exciter and generator to produce Vout. The equation derived from the block diagram is:

$$\frac{Vout\ (s)}{Vref} = \frac{C(s)\ D(s)}{1 + C(s)\ D(s)}$$

From the equation one can see that if $C(s)\ D(s) = -1$ the denominator of the equation will equal zero and Vout/Vref will equal infinity. This is the condition that will produce "instability". In practical terms, it means that, at some value of gain greater than 1, you will have a phase shift of $-180°$ or greater; this is, in effect, positive feedback. The number of degrees you have from $-180°$ to when your gain equals 1 (0 db) is called "phase margin" and is a measure of how stable your system is.

Figure 9:
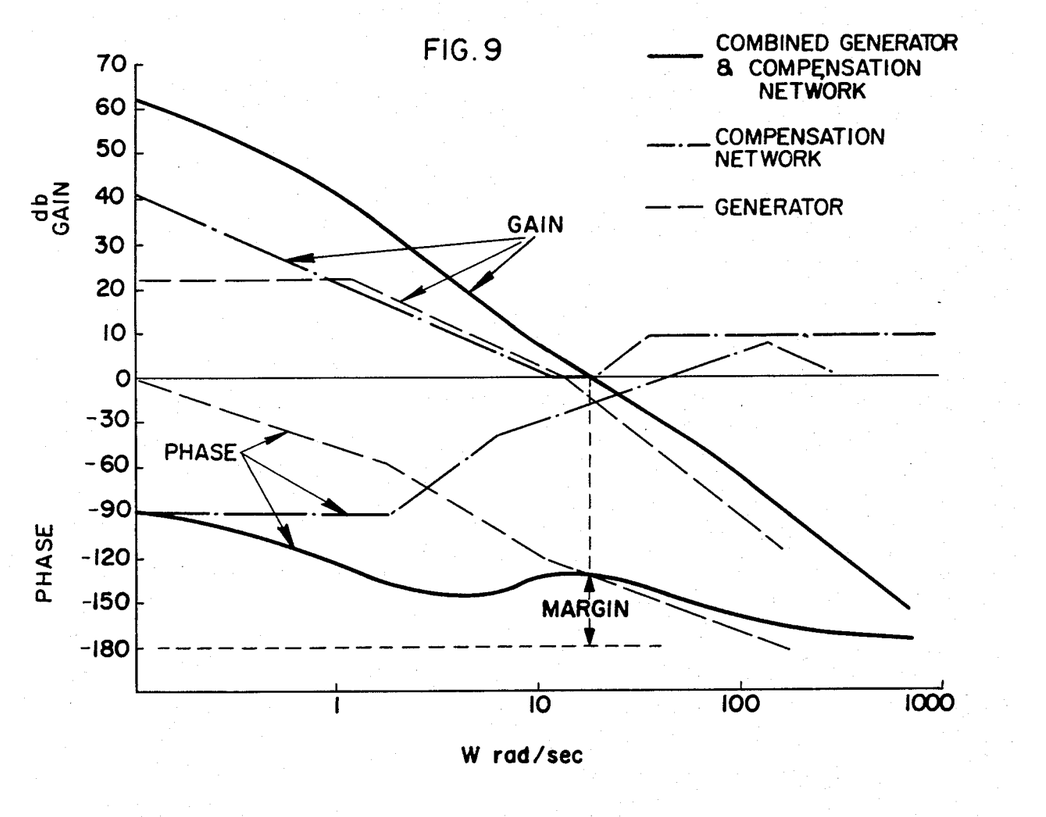
FIG. 9 is a Bode Plot of the frequency and gain characteristic of the voltage regulator.

A typical generator frequency response is shown in FIG. 9. The graph (a Bode Plot) shows the magnitude and phase in db of the generator output voltage divided by the input voltage to the exciter as a function of frequency.

From the Bode Plot of the generator and exciter one can see that if the compensation equaled 1, the system would be stable. While this system would be stable, the gain at low frequencies is low. The lower the low frequency gain, the worse your voltage regulation will be. The ideal characteristics for the compensation network are: high gain at low frequency for good regulation; and high gain at high frequency for good transient response. Unfortunately, high gain at high frequency is not compatible with stability. As can be seen, the compensation network (See FIG. 9) provides high gain at low frequencies and some gain at high frequency while not adding much additional phase shift. The particular system illustrated in the drawings has a phase margin of approximately 47°.

Tests showed that the FETs ran extremely cool, even at current levels over the rated amps. During field testing it is found that improved performance would occur if the transistors were insulated with a silicone rubber compound; this is preferred over beryllium oxide or mica insulators.

From the foregoing description the invention offers the following advantages over comparable products of a conventional design:

1. Asynchronous switching permits immunity from "SCR load tracking" phenomenon on such loads such as battery chargers and computer switching power supplies.
2. Adjustable volts/hertz capability permits field tailoring of load pickup and rejection characteristics for precise voltage regulation when necessary.
3. Current limiting of the regulator protects the regulator from overheating and premature failure during severe duty cycle loading and high ambient temperature operation.
4. The use of MOSFET switching devices permit the reliable use of the regulator in severe high ambient temperature applications where SCR switching devices are much less reliable.

5. The regulator may be encapsulated due to the low heat radiated from the MOSFETs. Encapsulation protects the regulator from vibration and fatigued component failure. It also forms a second barrier to prevent environmental contamination of the assembly.

It should be understood that no limitation with respect to the specified apparatus illustrated herein is intended or should be inferred. It is, of course, intended to cover by the appended claims all such modifications as fall within the scope of the claims.

We claim:

1. A voltage regulator for an A.C. generator having a field winding, comprising:
   (a) input terminals for connection to a generator load;
   (b) output terminals for connection to the generator field winding;
   (c) voltage controlled field-winding excitation control means, connected across said input terminals, for supplying direct current to said output terminals;
   (d) drive means for driving said voltage controlled field-winding excitation control means;
   (e) frequency sensing means for generating a voltage proportional to the frequency across said input terminals when said frequency is below a preselected break-point frequency and and for generating a constant voltage when said frequency is above said break-point frequency; and
   (f) asynchronous switching regulator means, connected to said frequency sensing means and said input terminals, for producing a train of output voltage control signals adapted to operate said drive means in response to the frequency and voltage out of said generator, said break-point frequency being sufficiently high that said regulator is essentially insensitive to relatively small changes in engine speed when said generator is operating under load.

2. The voltage regulator set forth in claim 1, wherein said voltage controlled field-winding excitation control means includes at least one MOSFET defining a gate terminal, a source terminal, and a drain terminal.

3. A voltage regulator for an A.C. generator having a field winding, comprising:
   (a) input terminals for connection to a generator load;
   (b) output terminals for connection to the generator field winding;
   (c) a voltage controlled field-winding excitation control means connected across said input terminals, for supplying direct current to said output terminals, said voltage controlled field-winding excitation control means including at least one MOSFET defining a gate terminal, a source terminal, and a drain terminal;
   (d) drive means for driving said voltage controlled field-winding excitation control means;
   (e) frequency sensing means for generating a voltage proportional to the frequency across said input terminals when said frequency is below a preselected break-point frequency and for generating a constant voltage when said frequency is above said break-point frequency;
   (f) asynchronous switching regulator means, connected to said frequency sensing means and said input terminals, for producing a train of output voltage control signals adapted to operate said drive means in response to the frequency and voltage out of said generator; and
   (g) voltage means, powered by said input terminals, for supplying voltage to the gate of said MOSFET during the start-up of said generator.

4. The voltage regulator set forth in claim 3, wherein:
   said drive means is a common emitter transistor switch, the gate of said MOSFET being coupled to the collector of said transistor and the base of said transistor being operated in response to said train of output voltage control signals; and
   wherein said voltage means is a voltage doubler.

5. The voltage regulator set forth in claim 3, wherein said break-point frequency is preset at 60 Hz.

6. The voltage regulator set forth in claim 3, wherein said voltage controlled field-winding excitation control means includes a full-wave rectifier in series with an inductance and disposed in combination across said input terminals.

7. The voltage regulator set forth in claim 3, wherein said output terminals includes a diode shunting said generator field winding.

8. The voltage regulator set forth in claim 3, further including an inductance coil connected in series with one of said input terminals and said generator load.

9. The voltage regulator set forth in claim 3, further including:
   a resistor in series with said MOSFET; and
   wherein said switching regulator means includes current limiting means, disposed across said resistor, for shutting-off said train of output voltage control signals in the event that a pre-selected current flow is exceeded.

10. The voltage regulator set forth in claim 4, further including zener diode means, connected to the base of said transistor, for holding said transistor shut-off until the voltage across said input terminals exceeds a preselected voltage,
    whereby said MOSFET is kept on by said voltage doubler during start-up of said generator.

11. The voltage regulator set forth in claim 3, wherein said voltage controlled field-winding excitation control means includes a plurality of MOSFETs connected in parallel with each other and each defines a gate, a drain, and a source, with each gate including a resistor connected in series with a common zener diode joined to the source terminals of each MOSFET.

12. The voltage regulator set forth in claim 6, further including voltage snubbing means, disposed across the rectified output of said full-wave rectifier, for limiting the rate of rise of voltage that occurs upon commutation of the current flowing through said inductance coil.

13. The voltage regulator set forth in claim 3, further including an inductance coil connected in series with one of said input terminals and said generator load; and wherein said voltage controlled field-winding excitation control means includes a full-wave rectifier, the input of which is disposed across said input terminals, and a zener diode disposed across the output of said rectifier.

14. The voltage regulator set forth in claim 12, wherein said voltage snubbing means comprises: a zener diode disposed in parallel across the rectified output of said full-wave rectifier; a resistor joined in a series with a capacitor, and the combination of the resistor and capacitor connected in parallel with said zener diode; and a diode in parallel with said resistor.

15. The voltage regulator set forth in claim 6, further including filtering means, disposed across the rectified output of said full-rectifier, for limiting waveform notching upon commutation of the current flowing through inductance.

16. The voltage regulator set forth in claim 15, wherein aid filtering means comprises a resistor in series with a capacitor and a diode in parallel with said resistor.

17. The voltage regulator set forth in claim 3, wherein said asynchronous switching regulator means comprises:
(a) a pulse width modulator driven by a free running oscillator;
(b) a constant regulated voltage output;
(c) adjustable means, disposed across said input terminals, for selecting the voltage output of said generator; and
(d) compensation means, powered by said constant regulated voltage output, for combining the output of said adjustable means and said frequency sensing means to operate said pulse width modulator and for setting the stability of said switching regulator means.

18. A voltage regulator for a generator having an AC output and a field-winding, comprising;
(a) a current sensing resistor;
(b) a plurality of MOSFETs connected in parallel with each other and in series with the field-winding and in series with said current sensing resistor, each MOSFET defining a gate, a drain and a source;
(c) rectifier means, powered by the output of said generator, for producing direct current across the series combination of said field-winding, said MOSFETs, and said current sensing resistor;
(d) asynchronous switching means for applying a voltage to each of said MOSFET gates to control the flow of direct current from said rectifier means and through said field-winding; and
(e) frequency sensing means, powering said switching means, for generating a voltage proportional to the frequency at the output of the generator when said frequency is below a pre-selected break-point frequency and for generating a constant voltage when said frequency is above said pre-selected break-point frequency.

19. The voltage regulator set forth in claim 18, further including a diode disposed across said fieldwinding.

20. The voltage regulator set forth in claim 18, further including filtering means disposed across the output of said rectifier means.

21. The voltage regulator set forth in claim 18, further including an inductor connected in series with said rectifier means and wherein the series combination of said rectifier means and said inductor is disposed across the output of said generator.

22. The voltage regulator set forth in claim 18, wherein each gate of said MOSFET includes an isolation resistor in series with a voltage clamp joined to the source terminal of each MOSFET.

23. The voltage regulator set forth in claim 22, further including a capacitor in parallel with said voltage clamp.

24. The voltage regulator set forth in claim 18, further including means, joined to the gate of said MOSFETS, for turning on said MOSFETs during the startup of said generator and before said switching means is turned on.

25. The voltage regulator set forth in claim 18, further including: a resistor and capacitor in series with each other and disposed together in parallel across the output of said rectifier means; and a diode disposed in parallel across said resistor.

26. The voltage regulator set forth in claim 18, wherein said switching means includes current limiting means, disposed across said current sensing resistor, for shutting off said switching means in the event that a preselected current value is exceeded.

27. A voltage regulator for a generator having a field-winding, comprising:
(a) a plurality of MOSFETs connected in parallel with each other and in series with the field-winding, each MOSFET defining a gate, a drain, and a source;
(b) means, disposed across the output of said generator, for supplying direct current across the series combination of said MOSFETs and said field-winding;
(c) frequency sensing means for generating a constant voltage when the frequency of said generator is above a pre-selected frequency;
(d) asynchronous switching means, operated in response to said frequency sensing means and the voltage out of said generator, for producing a train of output voltage signals adapted to control the gates of said MOSFETs,
whereby the flow of current through the field of the generator is a characteristic of the output voltage and frequency of the generator.

28. The voltage regulator set forth in claim 27, further including a resistor in series with said MOSFETs and said field-winding; and
current limiting means, driven by the voltage across said resistor, for shutting off said switching means when the current through the field exceeds a preselected value.

* * * * *